United States Patent [19]

Manunta

[11] Patent Number: 4,660,129

[45] Date of Patent: Apr. 21, 1987

[54] FRONT OPTICAL UNIT FOR MOTOR VEHICLES

[75] Inventor: Giorgio Manunta, Turin, Italy

[73] Assignee: Carello Industries S.P.A., Turin, Italy

[21] Appl. No.: 810,404

[22] Filed: Dec. 18, 1985

[30] Foreign Application Priority Data

Jan. 8, 1985 [IT]  Italy ............................... 52811/85[U]

[51] Int. Cl.[4] .......................... B60Q 1/00; F21V 13/00
[52] U.S. Cl. ..................................... 362/80; 362/243; 362/332
[58] Field of Search ............... 362/267, 332, 309, 308, 362/310, 61, 80, 83, 326, 327, 328, 329, 332, 339, 227, 235, 240, 242–245; D26/120, 139; 313/110, 113, 116

[56] References Cited

U.S. PATENT DOCUMENTS

| 4,198,674 | 4/1980 | Ilhage et al. | 362/80 |
| 4,277,818 | 7/1981 | Urbanek et al. | 362/267 |
| 4,475,148 | 10/1984 | Tomforde | 362/83 |
| 4,544,998 | 8/1985 | Shanks | 362/267 |

FOREIGN PATENT DOCUMENTS

| 764984 | 8/1971 | Belgium | 362/332 |
| 1101984 | 3/1961 | Fed. Rep. of Germany | 362/240 |
| 1814345 | 7/1969 | Fed. Rep. of Germany | 362/61 |
| 2108256 | 5/1983 | United Kingdom | 362/61 |

Primary Examiner—William A. Cuchlinski, Jr.
Assistant Examiner—D. M. Cox

[57] ABSTRACT

A front optical unit for motor vehicles, in which a headlamp is closed by a transparent front body constituted by a lens of glass disposed in front of a rear body of the headlamp, and by a frame of plastics material rigidly connected thereto; the frame surrounds the lens and anchors it to the rear body.

11 Claims, 6 Drawing Figures

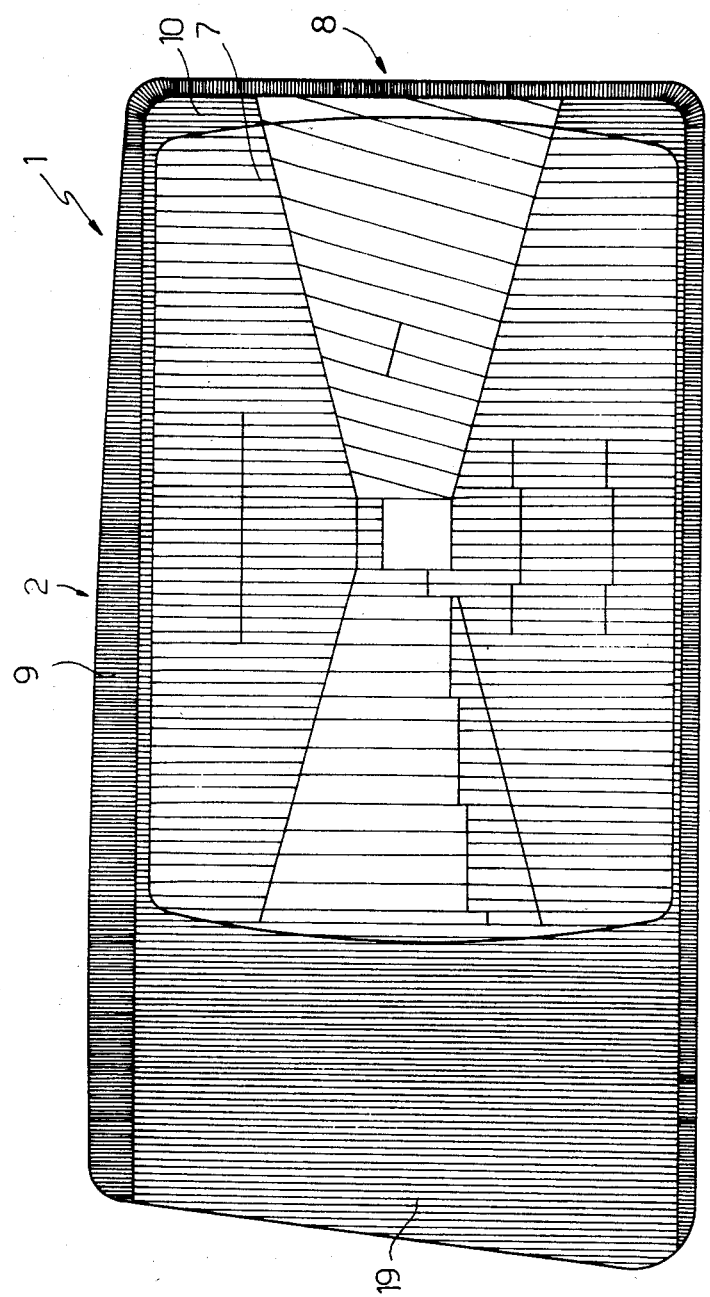

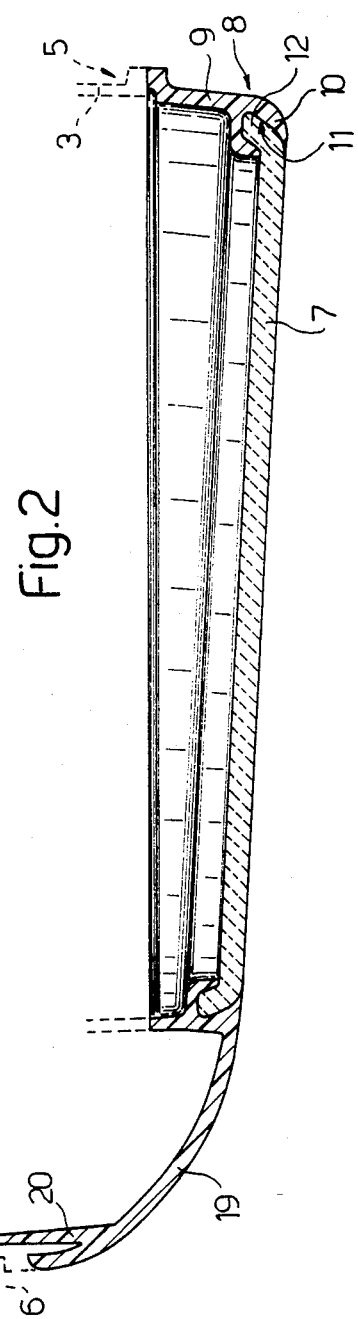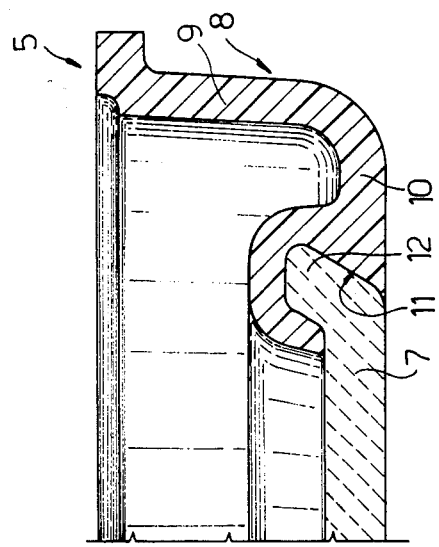

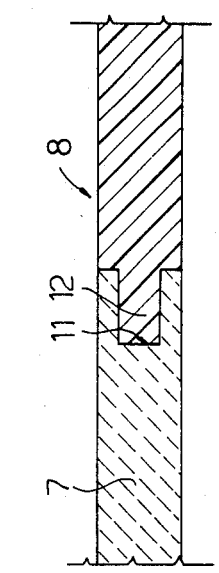
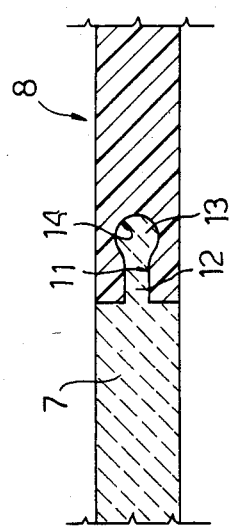
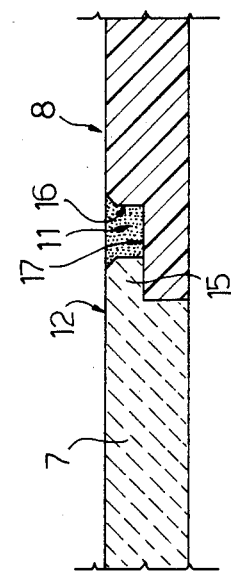

FRONT OPTICAL UNIT FOR MOTOR VEHICLES

BACKGROUND OF THE INVENTION

The present invention relates to a front optical unit for motor vehicles, of the type comprising a rear body constituted by at least one reflecting parabola operable to project a driving light outwardly thereof.

In general, in front optical units known until now, the above mentioned parabola is closed at the front by a front body constituted by a cup-shape glass lens the form and dimensions of which are determined by moulding requirements and the production of which requires the use of relatively expensive moulds and a relatively large quantity of materials. Known lenses must in fact have a thickness and robustness such as to allow their direct connection to the rear body of the headlamp.

SUMMARY OF THE INVENTION

The object of the present invention is that of providing a front optical unit for motor vehicles the front body of which has a reduced thickness with respect to known front bodies, is obtainable utilising relatively simple moulds, uses relatively reduced quantities of glass, and allows the widest freedom in design.

The said object is achieved by the present invention in that it relates to a front optical unit for motor vehicles comprising at least one driving light headlamp and front closure means for the said headlamp, characterised by the fact that the said closure means comprise a body constituted by two elements: a first of the said elements being constituted by transparent glass and constituting a front lens for the said headlamp, and the second of the said elements being made of plastics material and constituting a frame surrounding the said first element and rigidly connected thereto.

Given the ease with which the said plastics frame can be shaped, the same can extend laterally in such a way as to form the front cover for an indicator lamp forming part of the front optical unit and disposed adjacent the said headlamp.

In a preferred embodiment of the present invention, in fact, the said frame comprises a lateral portion, which is made at least in part of transparent plastics material, and constitutes a front closure element for an indicator lamp disposed adjacent to the said headlamp.

Preferably, the said first and second elements are connected together by means of an interfitting joint comprising an annular projection extending from one of the said two elements and an annular seat for the said projection formed on the other of the said elements.

Connection between the said projection and the said seat has been preferably formed by means of engagement obtained by moulding the said projection into the said seat. Alternatively, the connection between the said projection and the said seat has been obtained by welding or gluing.

BRIEF DESCRIPTION OF THE DRAWINGS

The present invention will now be described with reference to the attached drawings which illustrate several non limitative embodiments thereof, in which:

FIG. 1 is a front view of a front optical unit for motor vehicles formed according to the principles of the present invention;

FIG. 2 is a transverse section of a front portion of the optical unit of FIG. 1;

FIG. 3 illustrates, on an enlarged scale, a first variant of a detail of FIG. 2; and FIGS. 4, 5 and 6 respectively illustrate further variants of the detail of FIG. 3.

DETAILED DESCRIPTION OF THE INVENTION

In FIG. 1 there is illustrated a front optical unit for motor vehicles, indicated generally with the reference numeral 1 and comprising a front closure body generally indicated 2.

As illustrated in FIG. 2, the body 2 constitutes the front closure for the rear bodies 3 and 4 of a headlamp 5 and of an indicator lamp 6, respectively.

The body 2 comprises a substantially flat central lens 7 disposed in front of the rear body 3 of the headlamp 5, and a frame 8 surrounding the lens 7 and rigidly connected thereto, which is able to permit the fixing of the lens 7 to a front edge of the body 3. The frame 8 is of annular cup-shape form and includes an annular lateral wall 9 anchored at one edge to the front edge of the body 3 and integral, at the other edge, with the outer periphery of a substantially flat annular wall 10 the dimensions of which are wider in the variants of FIG. 3 et seq. The annular wall 10 has, along its inner periphery, an annular seat 11 which is engaged by an annular projection 12 extending outwardly of the outer periphery of the lens 7.

As illustrated in particular in FIG. 3 the annular seat 11 has, in section, a substantially rectangular form one axis of which is disposed along a generatrix of a truncated cone, whilst the projection 12 extends along a cone of identical form.

According to the variant illustrated in FIG. 4, the annular seat 11 and the associated projection 12 are respectively co-planar with the wall 10 and the lens 7, and the projection 12 carries, at its free edge, an annular rib 13 which engages in an annular groove 14 formed in the bottom surface of the seat 11.

In the variant illustrated in FIG. 5 the annular seat 11 has instead a substantially rectangular section, but is formed along a periphery of the lens 7 and receives in its interior a projection 12 extending from the periphery of the wall 10.

In all the above described variants, the engagement of the projection 12 with the interior of the seat 11 has been obtained by joint moulding of the lens 7 and the frame 8 by known one stage injection methods. In a one stage injection method, the lens 7 is first made and inserted into a mold prior to injection of the frame whereafter the frame is molded onto the lens.

In the variants of FIG. 6, the projection 12 is constituted by an annular rib 15 extending from the outer periphery of the lens 7 and abutting a frontal annular surface of a peripheral groove 16 formed on the front surface of the wall 10 and constituting the seat 11.

In a variant not illustrated the connection between the rib 15 and the groove 16 is formed by welding, whilst as illustrated in the variant of FIG. 6, the length of the rib 15 is less than the depth of the groove 16 and defines, with this latter, an annular space 17 filled by a strip 18 of adhesive and sealing material able to guarantee a sealed connection between the lens 7 and the frame 8.

As illustrated in FIG. 1, the wall 9 is preferably made of opaque plastics material whilst the wall 10 is preferably made of transparent plastics material.

As illustrated in FIGS. 1 and 2, the wall 10 has, laterally, a projection 19 which constitutes a front closure element for the indicator lamp 6 and has a peripheral attachment 20 for its connection to the front edge of the body 4.

From the preceding description it will be clear how the construction of the body 2 in two parts constituted by the lens 7 and the frame 8 allows not only the production of an extremely simple and low cost lens 7 peripherally anchored to the body 3 by means of the frame 8, but also the front closure of the headlamps 5 and the side lights 6 with a single element, which eliminates any fissure between the headlamp 5 and the indicator lamp 6 and can assume any form whatsoever such as to satisfy the stylistic requirements of the motor vehicle manufacturers.

I claim:

1. A front optical unit for vehicles comprising at least one headlamp, an indicator lamp adjacent said one headlamp, closure means for said headlamps, said closure means comprising a one piece frame made of plastics material, and a lens for said one headlamp, said lens being made of transparent glass and being rigidly connected to said frame, with said frame in surrounding relation to said lens, said frame of plastics material at least in part being transparent, said transparent part constituting a front cover for said indicator lamp.

2. The optical unit of claim 1, wherein said lens and said frame are interconnected by a two element joint, one element of which is provided on said lens, and the other of which is provided on said frame, said two element joint comprising an annular seat and an annular projection engaging said seat and fixedly connected thereto.

3. The optical unit of claim 2, wherein said fixed connection is obtained by a mold joint obtained on molding said frame about said lens.

4. The optical unit of claim 2, wherein said fixed connection comprises a weld joint.

5. The optical unit of claim 2, wherein said fixed connection is a glue joint.

6. A lamp assembly consisting of a front optical unit for vehicles comprising at least one headlamp, an indicator lamp adjacent to said at least one headlamp, and closure means for said lamps, said closure means comprising a one piece dual purpose frame made of plastics material, and a lens for said one headlamp, said lens being of transparent glass and being rigidly connected to said frame, with said frame in surrounding relation to said lens, said frame of plastics material at least in part being transparent and constituting a means for fixing the lens to said optical unit and simultaneously serving as a front cover for said indicator lamp.

7. The lamp assembly of claim 6, wherein said lens and said frame are interconnected by a two element joint, one element of which is provided on said lens, and the other of which is provided on said frame, said two element joint comprising an annular seat and an annular projection engaging said seat and fixedly connected thereto.

8. The lamp assembly of claim 7, wherein said fixed connection is obtained by a mold joint obtained on molding said frame about said lens.

9. The lamp assembly of claim 7, wherein said fixed connection comprises a weld joint.

10. The lamp assembly of claim 7, wherein said fixed connection is a glue joint.

11. The lamp assembly of claim 6, wherein the lens for the headlamp by means of said frame is fixed to a front edge of a reflecting rear body housing the headlamp, a lateral end portion of the transparent part of the frame, spaced from the rear body for the headlamp, being provided with a peripheral attachment part for connection to a front edge of a rear body for said indicator lamp.

* * * * *

UNITED STATES PATENT AND TRADEMARK OFFICE
CERTIFICATE OF CORRECTION

PATENT NO. : 4,660,129
DATED : April 21, 1987
INVENTOR(S) : Giorgio Manunta

It is certified that error appears in the above-identified patent and that said Letters Patent is hereby corrected as shown below:

At item [73] on the front face of the patent "Industries" should read --Industriale--.

Signed and Sealed this

Twenty-third Day of February, 1988

Attest:

DONALD J. QUIGG

*Attesting Officer*          *Commissioner of Patents and Trademarks*